Patented Nov. 3, 1942

2,300,832

UNITED STATES PATENT OFFICE 2,300,832

DERIVATIVES OF DINAPHTHOPERYLENE-DIONES

James Ogilvie, Buffalo, N. Y., assignor to Allied Chemical & Dye Corporation, a corporation of New York No Drawing. Application November 29, 1939, Serial No. 306,682

4 Claims. (Cl. 260—354)

This invention relates to novel organic compounds which are derivatives of dinaphthoperylene-diones of the type of dibenzanthrone and isodibenzanthrone. It relates more particularly to pyranthrone derivatives of diamino-3,4,9,10-dinaphthoperylene-1',1''-diones which are novel vat dyestuffs and also intermediates useful in the production of other vat dyestuffs, and to methods of preparing them.

According to the present invention, bis-(pyranthronylimino)-3,4,9,10-dinaphthoperylene-1', 1''-diones, useful as vat dyestuffs and as intermediates for the production of other vat dyestuffs are obtained by condensing two mols of a monoaminopyranthrone with one mol of a dihalogen-3,4,9,10 - dinaphthoperylene-1',1''-dione. For example, it has been found, by heating one mol of dibromdibenzanthrone with two mols of monoaminopyranthrone in the presence of an acid binding agent and a copper catalyst, condensation takes place with formation of a bis-(pyranthronylimino)-dibenzanthrone. This result is surprising inasmuch as it has been found that although one mol of dibromdibenzanthrone will condense quite readily with one mol of a number of arylamines it does not ordinarily condense with two mols of said arylamines.

The compounds of this invention are of the following general formula

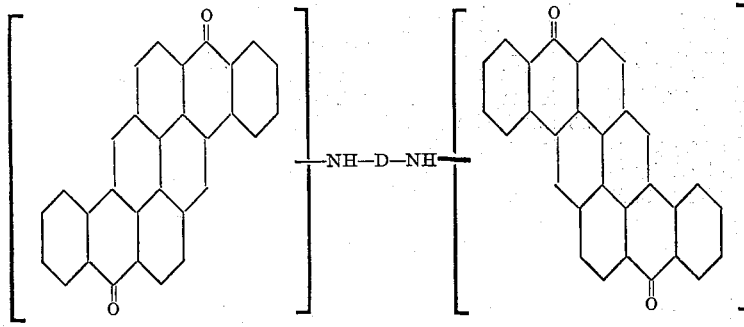

in which D is a single 3,4,9,10-dinaphthoperylene-1',1''-dione nucleus, for example a dibenzanthrone or an isodibenzanthrone nucleus.

The compounds of this invention also may be made by condensing two mols of a mono-halogenated pyranthrone with one mol of a diamino-3,4,9,10-dinaphthoperylene-1',1''-dione.

The amino derivatives used may be made by reducing the corresponding nitro derivatives of pyranthrone and 3,4,9,10-dinaphthoperylene-1',-1''-dione; for example, with a reducing agent (such as an alkali metal sulfide or an alkaline earth metal sulfide in aqueous solution, for instance, sodium, potassium, or calcium sulfide; or finely divided aluminum metal in the presence of concentrated sulfuric acid as a solvent). The dihalogen derivatives used may be made by halogenating the corresponding 3,4,9,10-dinaphthoperylene-1',1''-dione by pyranthrone with a halogen (such as, chlorine or bromine) in an inorganic or inert organic solvent (for instance, chlorsulfonic acid or nitrobenzene), or in aqueous suspension (for instance, by means of bromine water).

In the preferred practice of this invention two mols of monoaminopyranthrone obtainable by reducing mononitropyranthrone with aqueous sodium sulfide are condensed with one mol of the dibromdibenzanthrone obtainable by brominating dibenzanthrone, in chlorsulfonic acid in the presence of a bromine carrier (such as, sulfur or iodine).

The invention is illustrated by the following example in which the parts are by weight and temperatures are in degrees centigrade.

*Example*

In a suitable apparatus fitted with a reflux condenser and an agitator, a mixture of 289 parts of monoaminopyranthrone (prepared by reducing with aqueous sodium sulfide the mononitropyranthrone resulting from the nitration of pyranthrone suspended in nitrobenzene wtih fuming nitric acid containing 95% $HNO_3$), 210 parts of dibrom-dibenzanthrone (prepared by brominating dibenzanthrone in chlorsulfonic acid with the aid of iodine as a catalyst), 20 parts of dry basic copper acetate, 120 parts of soda ash, 25 parts of dry basic copper carbonate, and 2400 parts of nitrobenzene is heated to its boiling point and is kept boiling and refluxing until the bromine content of an isolated sample of the solid dyestuff is less than 4 per cent. (about 48 hours). The mixture is then allowed to cool to about 100°, is transferred to a distillation vessel, and steam-distilled to remove nitrobenzene. By filtration, the insoluble dyestuff left in the aqueous mixture is separated as a cake from the aqueous solution. After being washed with hot water to remove water-soluble impurities, the cake is dried in air. An excellent yield is obtained.

The product is chiefly bis-(pyranthronylimino)-dibenzanthrone. In a ground state it is a brown powder which dissolves in concentrated sulfuric acid to form a blue solution which when diluted with water precipitates the dyestuff as dark brown flocks. It dissolves in nitrobenzene to form a yellow solution, in aniline to form a yellow-brown solution, and in monochlorbenzene to form a yellow solution. These solutions in organic solvents are substantially free from fluorescence. The product is readily reduced in alkaline aqueous hydrosulfite to a vat which is red-violet from which cotton is dyed a dull olive shade to a greenish-black shade, depending upon the strength of the vat.

In a similar manner the product of the above example may be prepared by condensing two molar proportions of the corresponding monohalogenated pyranthrone with one molar proportion of the corresponding diaminodibenzanthrone. Related products may be obtained by substituting, for the said dihalogen and diaminodibenzanthrone compounds, other dihalogen and diaminodibenzanthrone compounds and derivatives thereof, (as for example, their lower alkyl, alkoxy, aryloxy, aryl carbonyl, and halogen derivatives) and related dihalogen and diamino isodibenzanthrone compounds and derivatives.

The amino or halogen derivatives of pyranthrone or of the 3,4,9,10-dinaphthoperylene-1',1''-diones, which are employed as intermediate products for the production of the bis-pyranthronylimino derivatives of the said dinaphthoperylene-diones in accordance with the present invention may be produced in other ways than those herein disclosed. Further, while it is desirable, as indicated above, to allow substantially two moles of the pyranthrone intermediate to react with one mol of the dinaphthoperylene-dione intermediate, it is not essential that the amounts correspond exactly with such proportions. While the condensation of the said amino and halogen derivatives with each other for the purpose of preparing the compounds of the present invention is preferably carried out with the aid of sodium carbonate and a mixture of basic copper carbonate and basic copper acetate in the presence of nitrobenzene as a solvent, and at temperatures ranging, for example, from about 200° to about 210° C., the reaction may be carried out in the presence of other high-boiling inert organic solvents with similar temperature ranges, and with the aid of other acid binding agents (as, for example, sodium acetate or magnesium oxide), and with copper or other copper compounds (as, for example, copper oxide, copper sulfate, etc.) as catalysts.

I claim:

1. A bis-(pyranthronylimino)-dibenzanthrone resulting from the condensation of two mols of a monoaminopyranthrone obtained by reducing a mononitropyranthrone resulting from the nitration of pyranthrone, with one mol of the dibromdibenzanthrone obtained by brominating dibenzanthrone in chlorsulfonic acid.

2. A bis-(pyranthronylimino)-dibenzanthrone resulting from the condensation of two mols of the monoaminopyranthrone obtained by reducing the mononitropyranthrone resulting from the nitration of pyranthrone with nitric acid in nitrobenzene, with one mol of the dibromdibenzanthrone obtained by brominating dibenzanthrone in chlorsulfonic acid, said bis-(pyranthronylimino)-dibenzanthrone being a brown powder, giving a blue solution in concentrated sulfuric acid, a yellow solution in nitrobenzene, and a yellow-brown solution in aniline, and dyeing cotton from a red-violet vat dull olive to greenish-black shades.

3. A method of making a bis-(pyranthronylimino)-dibenzanthrone in which the dibenzanthrone nucleus is free from substituents other than the pyranthronylimino substituents which comprises condensing two mols of a monoaminopyranthrone obtained by reducing a mononitropyranthrone resulting from the nitration of pyranthrone, with one mol of the dibromdibenzanthrone obtainable by brominating dibenzanthrone in chlorsulfonic acid, in the presence of an acid binding agent and a copper catalyst.

4. A method of making a bis-(pyranthronylimino)-dibenzanthrone in which the dibenzanthrone nucleus is free from substituents other than the pyranthronylimino substituents which comprises heating at a condensation temperature a reaction mixture comprising essentially at least two mols of the monoaminopyranthrone obtained by reducing the mononitropyranthrone resulting from the nitration of pyranthrone with nitric acid in nitrobenzene, one mol of the dibromdibenzanthrone obtainable by brominating dibenzanthrone in chlorsulfonic acid in the presence of iodine, sodium carbonate and copper carbonate until the reaction mixture is substantially free from bromine.

JAMES OGILVIE.

CERTIFICATE OF CORRECTION.

Patent No. 2,300,832.   November 3, 1942.

JAMES OGILVIE.

It is hereby certified that error appears in the printed specification of the above numbered patent requiring correction as follows: Page 1, second column, line 7, for "by" read --or--; and that the said Letters Patent should be read with this correction therein that the same may conform to the record of the case in the Patent Office.

Signed and sealed this 29th day of December, A. D. 1942.

(Seal)
Henry Van Arsdale,
Acting Commissioner of Patents.